United States Patent Office 3,238,169
Patented Mar. 1, 1966

3,238,169
ALKALINE FREE-RADICAL POLYMERIZATION IN THE PRESENCE OF A DISSOLVED COPOLYMER OF MONOALKYL ESTER OF ITACONIC ACID
Norwin Wolff, Cambridge, Mass., assignor to A. E. Staley Manufacturing Company, Decatur, Ill., a corporation of Delaware
No Drawing. Filed Oct. 1, 1962, Ser. No. 227,541
9 Claims. (Cl. 260—29.6)

This invention relates to the aqueous emulsion polymerization of a vinylidene compound in the presence of a dissolved emulsion copolymer of an alkyl ester of an alpha, beta-ethylenically unsaturated monocarboxylic acid and a monoalkyl ester of itaconic acid. More particularly, this invention relates to the preparation of polystyrene latices suitable for use in floor polishes and paints which comprises the aqueous alkaline emulsion polymerization of styrene in the presence of a dissolved emulsion copolymer of an alkyl ester of an alpha, beta-ethylenically unsaturated monocarboxylic acid and a monoalkyl ester of itaconic acid.

The growing use of self-polishing or "dry-bright" floor polishes has stimulated the development of improved floor polishes based on emulsion polymers of styrene and/or acrylates. Many of the commercially available emulsion polymers based upon these monomers are not suitable for use in floor polishes since they lack the small particle size necessary for really superior high gloss finishes. Further, those polymers which have a brittle point above room temperature (most polymers based primarily on so-called "hard" monomers such as styrene or methyl methacrylate) do not form films when deposited from an aqueous emulsion.

A wide variety of emulsifiers have been used in order to prepare stable aqueous emulsion polymers suitable for floor polishes having the necessary small particle size, film forming characteristics, water-resistance, freedom from color, etc. In general, the higher the concentration of emulsifier or emulsifiers used, the smaller the particle size of the emulsion polymer and corresponding the higher the gloss of the applied coating. However, the higher the concentration of most emulsifiers the more water-sensitive the applied coating. Till now, shellac has been the emulsifier of choice in the preparation of floor polishes based on styrene, since shellac can be used in high concentrations without making the applied coating based on it water-sensitive. While shellac can be dissolved in dilute alkali, it forms water-resistant coatings. Further, shellac tends to plasticize many polymers, which would normally not be film forming, enabling their use in applied coatings.

Unfortunately, polymers produced using shellac as an emulsifying agent often have objectionable colors due to the presence of color bodies in shellac. Even shellac of the lightest color tends to darken upon exposure. Floor polishes or paints compounded from such polymers are subject to the same drawbacks. In addition to the color problems associated with the use of shellac, shellac is often undesirable due to susceptibility to attack by various types of organisms and due to its lack of uniformity. Further, being a natural product, it is subject to wide price fluctuation.

While particle size is not as important in paint polymers, it is essentially that paint polymers be freeze-thaw stable in the emulsion form and that their applied coatings be continuous, water-resistant, etc.

The object of this invention is to provide a process for preparing light-colored, small particle size, film forming and non-film forming emulsion polymers of vinylidene compounds which comprises the alkaline emulsion polymerization of vinylidene compounds in the presence of a dissolved plasticizing, high molecular weight emulsion copolymer of an alkyl ester of an alpha, beta-ethylenically unsaturated monocarboxylic acid and a monoalkyl ester of itaconic acid suspending agent which dissolved polymer, by itself, forms water-resistant films.

In application Serial No. 196,334, filed May 21, 1962, there are disclosed a series of alkali soluble, film forming emulsion polymers which form water-resistant coatings. I have now found that these copolymers are excellent emulsifying agents for alkaline emulsion polymerization of a wide variety of monomers. Further, these copolymers plasticize various types of copolymers which normally have a brittle point above 20° C. ($T_1$ Temperature), giving said copolymers excellent film forming properties. In addition to the foregoing, these alkali-soluble polymers are excellent emulsion stabilizers. Further, emulsion copolymers prepared using said alkali-soluble polymers have excellent freeze-thaw stability.

As pointed out above the suspending agents of this invention are produced by the aqueous emulsion polymerization of a monoalkyl ester of itaconic acid and an alkyl ester of an alpha, beta-ethylenically unsaturated monocarboxylic acid. The monoalkyl esters of itaconic acid contain from 1 to 18 carbon atoms in the alkyl group such as methyl or stearyl. The preferred monoalkyl esters of itaconic acid contain from 4 to 8 carbon atoms in the alkyl group, such as n-butyl, n-hexyl, n-octyl and 2-ethylhexyl. Generally, the monoalkyl ester of itaconic acid comprises from about 8 to 20 mole percent of the copolymer. However, it may comprise from about 5 to 50% of the copolymer.

As pointed out in the aforementioned application, the alkyl esters of the alpha, beta-ethylenically unsaturated monocarboxylic acids, which comprise from about 40 to 95 mole percent of the monomeric units in the emulsifier of this invention, include "soft monomers" such as methyl acrylate, ethyl acrylate, isopropyl acrylate, butyl acrylate, amyl acrylate, hexyl acrylate, heptyl acrylate, 2-ethyl hexyl acrylate, butyl methacrylate; amyl methacrylate, dodecyl methacrylate, etc., and "hard monomers" such as methyl methacrylate, tert butyl methacrylate, cyclohexyl methacrylate, hydroxyethyl methacrylate, etc. These monomers can be represented by the formula:

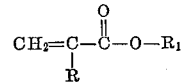

wherein R is methyl or hydrogen; when R is methyl $R_1$ is an alkyl group of from 1 to 12 carbon atoms; when R is hydrogen, $R_1$ is an alkyl group of from 1 to 8 carbon atoms. The term "soft" is used herein in referring to polymers formed from the monomer alone, in the way that is common in this technology. (See Riddle, "Arcrylic Esters," Reinhold Publishing Company, 1954, pages 58, et seq. Also Patent No. 2,195,564.) Generally, this refers to the "brittle-point" of the polymer, i.e., the temperature on which the polymer breaks on flexing. Polymers of the soft alkyl esters of alpha, beta-ethylenically unsaturated monocarboxylic acid have brittle points below about 20° C. while the hard esters have brittle points above about 20° C.

In general, the alkyl esters are soft monomers in the above formula where R is hydrogen (acrylic esters) and $R_1$ is a primary or secondary alkyl group of from 1 to 8 carbon atoms or when R is methyl (methacrylic esters) and $R_1$ is a primary or secondary alkyl group of from 4 to 12 carbon atoms. On the other hand, the alkyl esters are hard monomers in the above formula when R is hydrogen and $R_1$ is a tertiary alkyl group or a cycloalkyl group, or when R is methyl and $R_1$ is an alkyl group of from 1 to 3 carbon atoms, a tertiary alkyl group or cycloalkyl group.

As pointed out in the above application various other dissimilar copolymerizable ethylenically unsaturated comonomers, such as styrene, vinyl toluene, vinylidene chloride, allyl alcohol, stearyl methacrylate, isoprene, dibutyl itaconate, dimethyl itaconate, etc., can comprise up to about 20 to 40 mole percent of the monomeric units in the copolymer.

The alkali soluble copolymer used as emulsifier in this invention can be composed solely of a monoalkyl ester of itaconic acid and a single alkyl ester of an alpha, beta-ethylenically unsaturated monocarboxylic acid. The preferred copolymers contain at least some soft alkyl ester of an alpha, beta-ethylenically unsaturated monocarboxylic acid and some hard alkyl ester of an alpha, beta-ethylenically unsaturated monocarboxylic acid in addition to the monoalkyl ester of itaconic acid. However, in order to give the emulsion copolymers and coatings therefrom, prepared with these alkali-soluble polymeric emulsifiers the proper balance of hardness, freedom from tack, gloss, flexibility, etc., the alkali soluble copolymers preferably contain from about 20 to 87 mole percent of a soft alkyl ester (preferably at least some ethyl acrylate), from about 5 to 60 mole percent of a hard alkyl ester and from about 8 to 20 mole percent of a monoalkyl ester of itaconic acid, the total being 100%.

Briefly, the aqueous emulsion copolymers of this invention are prepared by polymerizing a vinylidene monomer at an alkaline pH in the presence of the aforementioned alkali-soluble copolymer dissolved at an alkaline pH in the aqueous emulsion polymerization medium.

One or more of any of the aforementioned alkyl esters of alpha, beta-ethylenically unsaturated monocarboxylic acids; monovinyl aromatics such as styrene, para-chlorostyrene, para-nitrostyrene, 1,4-divinyl benzene, vinyl toluene, 2,4-dimethylstyrene, etc.; acrylonitrile; acrylamide; or vinyl acetate can be employed as the vinylidene monomer or monomers. It is preferred, however, that at least 50 mole percent of the vinylidene monomers to be polymerized be a "hard" monomer, preferably styrene, vinyl toluene, methyl methacrylate or acrylonitrile. As explained above, polymers based primarily on these "hard" monomers often have $T_1$ values above 20° C. and accordingly cannot normally be deposited from an aqueous emulsion as a continuous film, and it is for these that this invention has its greatest advantage. Although the concentration of vinylidene monomer and alkali soluble polymer can vary within wide limits it has been found that the best results have been obtained using from about 10 to 100 parts alkali-soluble polymer per each 100 parts of vinylidene monomer to be polymerized.

The alkali employed to establish the pH of the polymerization system (i.e., to dissolve the alkali soluble polymer) can include alkali metal hydroxides, such as sodium hydroxide or potassium hydroxide; amines, such as tetramethyl ammonium hydroxide, diethanol amine, morpholine; ammonia; etc. Generally, it is preferable to employ a volatile alkali, such as morpholine or ammonia, since volatile alkali is normally employed to establish the pH of emulsion polymer based floor polishes and paints. Only sufficient alkali is employed to establish a pH of about 7.2 to about 12 in the polymerization mixture. The lower end of the pH range may vary from about 7.2 to about 8 depending upon the pH necessary to dissolve the specific alkali soluble polymer to be used in the particular alkali. Since the alkali solubility characteristics of these copolymers is discussed in detail in the aforementioned application, it is sufficient for the purpose of this application to state that the minimum amount of alkali to be employed is that which will dissolve the alkali soluble polymer. Although the upper end of the pH range is not as important when monomers which do not hydrolyze readily such as styrene and methyl methacrylate are polymerized, it is generally advisable to carry out polymerizations utilizing more readily hydrolyzable monomers at the lower end of the pH range. However, even with monomers, such as styrene and methyl methacrylate, it is desirable to carry out the polymerization at a sufficiently low pH that the polymerizate has a pH of ten or less. In this way undesirable salts are not formed when the latices are adjusted to a pH of about 8–10 for use in paint or floor polish latices.

Although the alaki soluble polymer employed in this invention may be the sole emulsifier, various other nonionic or cationic dispersing or emulsifying agents may be employed with it. The preferred nonionic surface active agents (alkyl phenoxy polyoxyethylene ethanols) are composed of a hydrophobic hydrocarbon portion and a hydrophilic portion. The latter is a chain of 2 to 120 oxyethylene units while the former has an alkyl group of 4 to 18 carbon atoms which is linked to the oxyethylene chain through a phenoxy group. Typical cationic surface active agents which may be used in this invention are ammonium or alkali metal (e.g., sodium) salts of alkyl (e.g., lauryl) ether sulfate, ammonium or alkali metal salts of alkyl phenoxy polyoxyethylene ethanol sulfate esters (and similar polyoxyethylene derivatives) tetrasodium salt of N-(1,2-dicarboxyethyl) N-octadecyl sulfosuccinamate (Aerosol 22), alkali metal and ammonium salts of polyelectrolytes (Daxad 30), sodium alkyl (e.g., lauryl) sulfate, etc.

As polymerization catalyst, there may be used one or more of the free-radical catalysts, either those of some solubility in aqueous solutions of the emulsifier or those of solubility only in the monomer phase. Among the useful peroxidic catalysts for the present type of polymerization are the persulfates, including ammonium, sodium and potassium salts, hydrogen peroxide, and perborates. Also useful are the organic peroxides and hydroperoxides. These include benzoyl peroxide, tertiary butyl hydroperoxide, diisopropyl benzene hydroperoxide, cumene hydroperoxide, caproyl peroxide, methyl ethyl ketone peroxide, etc. Other free-radical catalysts are also useful, such as azo-diisobutyronitrile and other aliphatic azo compounds of the type having an acyclic azo group and an aliphatic carbon atom on each nitrogen, at least one of which is tertiary. In part, the particular combination of monomers governs the selection of the inorganic or organic peroxidic catalysts since some monomers respond better to one variety than they do to another.

The amount of peroxidic catalyst required is about proportional to the concentration of monomers used. The usual range is 0.01% to 3% of catalyst with reference to the weight of the monomer mixture. The preferred range is from 0.10 to 1.0% while the range of 0.4–0.8% is usually best. The optimum amount of catalyst is determined in large part by the nature of the particular monomer selected, including impurities which accompany particular monomers.

Frequently, a promoter for the catalyst (sometimes called an "accelerator" or "adjuvant") is used to hasten the reaction at a sufficiently low temperature to avoid coagulation. The promoter may be a reducing agent and together with the peroxidic catalysts is frequently referred to as a "redox system." Many examples of such system are known and the promoters include ascorbic acid, and soluble sulfites, hydrosulfites, sulfoxalates, thiosulfates, and bisulfites. Particular promoters are exemplified by sodium hydrosulfite, sodium metabisulfites, zinc or sodium formaldehyde sulfoxalate, and calcium bisulfite. Polyvalent metal ions are also used in small concentration, particularly ferrous ion in the form of ferrous ammonium sulfate at concentrations of a few parts of ferrous ion per million.

The amount of promoter required varies, as is known, with the free-radical initiator chosen and with the particular promoter. At the outside, not more than 3% or less than 0.01% is used in these situations. The preferred range of ascorbic acid is at low the end of this range up to about 0.5% while sulfites are used preferably in an amount of 0.2 to 1%.

In somewhat greater detail the aqueous emulsion copolymers of this invention are prepared by adding the alkali soluble polymer in the solution form of emulsion form to the polymerization mixture either before or after the addition of the monomers to be polymerized. In the alkali soluble polymer is added in the emulsion form, an alkaline pH is then established to dissolve it and then polymerization is initiated with a suitable catalyst system.

Copolymerization is best effected below about 95° C. The preferred range is 30° to 70° C., although slightly lower (0° C.) and somewhat higher temperatures are permissible. After most of the monomers have been converted to copolymer, temperatures even higher than 95° C. may then be applied. In fact, after most of the monomers have copolymerized, the resulting emulsion copolymer system can be heated to boiling without breaking the emulsion. During copolymerization the temperature can be controlled in part by the rate at which monomers are supplied and poylmerized and/or by applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. An advantage of gradual addition of monomers lies in reaching a high solids content with optimum control, over temperature especially and with maximum uniformity of product. Additional catalyst or additional components of the redox system may be added as polymerization proceeds, and these can be used to control the speed of reaction to avoid overheating.

The resultant polymerizate can then be shipped to a floor polish or paint formulator, for example, or immediately formulated into a suitable product.

In formulating a paint based upon the copolymer prepared by the process of this invention, the emulsion copolymer is adjusted to an alkaline pH below 10 and preferably between 8.0 and 9.5 with an alkali, ammonia, preferably, although a water-soluble amine or an alkali metal hydroxide may be used at least in part. The aqueous polymeric emulsion is then mixed with dispersed pigments, coalescing agents, and other paint ingredients to produce the paint properties desired. The compounded paints have exhibited outstanding leveling, gloss, mar resistance and adhesion on various types of substrates without the relatively high mole percent of itaconic acid half ester moieties (potentially free carboxyl groups) in the emulsifier detracting from the water resistance of the paint. Further, the carboxyl groups in the emulsifier enhance the adhesion of these paints to masonry and metal finishes. Small amounts of calcium, zinc or magnesium ions on the masonry surface tend to insolubilize the coating by reacting with the carboxyl groups, while the carboxyl groups have a natural affinity for metal surfaces.

In formulating a floor polish for resilient flooring with the emulsion copolymer of this invention, the emulsion copolymer is adjusted to a pH of about 8 to 10 with a volatile alkali (preferably ammonia or morpholine). The aqueous polymeric solution is then mixed with a wax, coalescing agents and other floor polish ingredients. When the alkali-soluble emulsifying agent of this invention is used in a sufficiently high concentration in the polymerization mixture, conventional alkali soluble resins and/or shellac normally added to "dry-bright" floor polishes can be completely omitted.

While this invention is primarily directed to the preparation of emulsion polymers suitable for floor polishes and paints, it will be evident that they may readily be compounded with pigment for paper coatings and used for that purpose. Without pigments, the emulsions are useful as clear coatings on paper, linoleum, etc. Further, in any of the above uses, the high concentration of carboxyl groups in the emulsifier makes it attractive to incorporate various types of crosslinkers, such as epoxy compounds (for example Unox 201 or Unox 206), polymethylol compounds, polyazirdinyl compounds (for example MAPO or MAPS) etc., in the coating composition. Subsequently cured coatings are often more resistant to solvents than coatings of water-insoluble copolymers having no reactive groups and produced by other routes, such as inorganic solvents.

The following examples are merely illustrative of the invention and should not be construed as limiting the scope of this invention. The copolymers described were prepared by the method of the copending application referred to before.

*Example I*

One hundred parts (25 parts dry weight) of an aqueous emulsion copolymer (composed of 10.6 mole percent monobutyl itaconate, 56.7 mole percent ethyl acrylate and 32.7 mole percent methyl methacrylate), 1.0 part (dry weight) Duponol WAQE (sodium salt of technical lauryl alcohol sulfate) and sufficient 20° Baumé ammonia to establish a pH of 9.5 were dissolved at 30° C. in 92 parts water in a suitable glass-lined reactor with a stirrer, jacket and nitrogen inlet tube. After the reactor was purged with nitrogen gas, 75 parts styrene was mixed into the vessel. After 0.75 part of tertiary butyl hydroperoxide was added to the reaction vessel, the reaction vessel was cooled to 25° C. Then 0.025 part of ascorbic acid was added to the reaction vessel and the reaction temperature was allow to rise to 80° C. and held at this temperature, until the polymerization was complete.

A floor polish was prepared from the above emulsion copolymer by mixing 70 parts (dry weight of the above copolymerizate), 20 parts shellac, 10 parts emulsified polyethylene and 1.0 part tributoxyethyl phosphate (KP-140). The floor polish was diluted to 15% by weight total solids and adjusted to a pH of 9 with ammonium hydroxide. The applied floor polish had good gloss and water resistance.

*Example II*

Two hundred fifty parts (50 parts dry weight) of the aqueous copolymer employed in Example I, 100 parts styrene and 47 parts water were adjusted to a pH of 9.55 with 26° Baumé ammonia in a suitable glass-lined reactor. After 0.55 part dibenzoyl peroxide were added to the reaction vessel, 0.04 part ascorbic acid was also added. Reaction was maintained at 80° C. until the polymerization was complete.

To produce a floor polish, 10.8 parts (dry weight of the copolymerizate, 1.4 parts wax and 0.8 part KP 140 were diluted to 15% solids. The applied floor polish had excellent gloss, good water resistance and excellent re-coatability properties.

*Example III*

Example II was repeated with essentially the same results using 50 parts of an alkali-soluble copolymer composed of 10.6 mole percent monobutyl itaconate, 67.6 mole percent ethyl acrylate and 21.8 mole percent methyl methacrylate.

*Example IV*

Example II was repeated with essentially the same results using 50 parts of an alkali-soluble copolymer composed of 9.7 mole percent monobutyl itaconate, 1.4 mole percent monomethyl itaconate, 15.1 mole percent ethyl acrylate, 15.1 mole percent methyl methacrylate and 58.6 mole percent methyl acrylate.

*Example V*

Example II was repeated except that 4.0 parts of 2-vinylpyrrolidone was added to the polymerization mixture. The applied floor polish had good gloss, outstanding water resistance and good recoatability.

*Example VI*

Example II was repeated using a polymerization charge of 50 parts (dry weight) of the alkali-soluble copolymer used in Example I, 50 parts styrene and 50 parts acrylonitrile. The applied floor polish had good gloss, good water-resistance and excellent recoatability.

*Example VII*

Example VI was repeated using a polymerization charge of 50 parts (dry weight) of the alkali-soluble copolymer used in Example I, 65 parts styrene, 35 parts acrylonitrile and 4 parts methyl carbitol. The applied floor polish had good gloss, excellent water-resistance and excellent recoatability.

*Example VIII*

Example VII was repeated except that the methyl carbitol was replaced with 4.0 parts of Cellosolve acrylate. The applied floor polish had good gloss, fair to good leveling characteristics, good water-resistance and fair to good recoatability.

*Example IX*

Example II was repeated using a polymerization charge of 50 parts of the alkali soluble copolymer used in Example I, 65 parts styrene and 35 parts methyl methacrylate. The applied floor polish had good gloss and excellent water-resistance.

*Example X*

Example I was repeated using a polymerization charge of 10 parts (dry weight) of the alkali soluble copolymer used in Example I, 80 parts styrene and 10 parts 2-ethylhexylacrylate. An applied flor polish had good gloss.

*Example XI*

A copolymer suitable for the preparation of high gloss paints was prepared by the method of Example I using 72 parts styrene and 28 parts dry weight of an alkali-soluble copolymer (composed of 12.3 mole percent monobutyl itaconate, 6.9 mole percent methyl methacrylate, 16.6 mole percent butyl acrylate and 64.2 mole percent ethyl acrylate). The following pigment dispersions were then prepared:

|  | Parts | |
|---|---|---|
|  | Dry | Total |
| Above polymerizate (at 20% total solids) | 30.0 | 150.0 |
| Water |  | 40.0 |
| Diethyl Carbitol |  | 20.00 |
| Daxad 30 (Sodium salt of polyelectrolyte) | 2.0 | 6.00 |
| Antifoamer NDW |  | 0.50 |
| Ti Pure R-900 (Titanium dioxide) | 250.00 | 250.00 |
| Tamol N | 0.50 | 0.50 |

The above 60% solids composition was ball milled for eight hours. Twenty-five parts (dry weight) of the pigment dispersion was then compounded with an additional 25 parts (dry weight) of the copolymerizate of this example and 0.1 part Antifoamer NDW. The paint composition was diluted with water to 40% total solids and adjusted to a pH of 8.2 with ammonia. The applied paint had excellent gloss and water-resistance.

*Example XII*

The process of Example II was repeated using 69 parts styrene, 5 parts di-2-ethylhexyl fumarate and 26 parts dry weight of the alkali-soluble copolymer used in Example XI.

*Example XIII*

The process of Example II was repeated using 67 parts styrene, 15 parts butyl acrylate and 18 parts dry weight of the alkali-soluble copolymer used in Example XI.

*Example XIV*

Example XIII was repeated except that 4 parts of methyl methacrylate replaced 4 parts of the styrene in the polymerization charge.

*Example XV*

Example I was repeated using a polymerization charge of 20 parts (dry weight) of the alkali-soluble copolymer used in Example I, 50 parts styrene, 20 parts ethyl acrylate and 10 parts stearyl methacrylate.

*Example XVI*

Example I was repeated using a polymerization charge of 20 parts (dry weight) of the alkali soluble copolymer used in Example I, 50 parts styrene and 30 parts vinylidene chloride.

Since many embodiments of this invention can be made and since many changes may be made in the embodiments described, the foregoing is to be interpreted as illustrative only and our invention is defined by the claims appended hereafter.

I claim:

1. The method of providing light-colored, small particle size, freeze-thaw stable emulsion polymers which comprises polymerizing under alkaline free-radical polymerization conditions a vinylidene monomer in the presence of a dissolved emulsion copolymer comprising as its two essential monomers from 95 mole percent to 40 mole percent of an alkyl ester of an alpha, beta-ethlylenically unsaturated monocarboxylic acid and from 5 to 50 mole percent of an alkyl half-ester of itaconic acid wherein said two essential comonomers comprise at least 60 mole perecnt of said copolymer.

2. The method of claim 1 wherein said vinylidene monomer comprises a monomer selected from the group consisting of styrene, vinyl toluene, acrylonitrile and methyl methacrylate.

3. The method of providing light-colored, small particle size, freeze-thaw stable emulsion polymers, which comprises polymerizing under alkaline free-radical polymerization conditions a vinylidene monomer in the presence of a dissolved emulsion copolymer comprising as its two essential monomers from 95 mole percent to 40 mole percent of an alkyl ester of an alpha, beta-ethylenically unsaturated monocarboxylic acid and from 5 to 50 mole percent of an alkyl half-ester of itaconic acid wherein said two essential comonomers comprise at least 60 mole percent of said copolymer and said alkyl ester of an alpha, beta-ethylenically unsaturated monocarboxylic acid comprises at least one hard alkyl ester of an alpha, beta-ethylenically unsatutrated monocarboxylic acid and at least one soft alkyl ester of an alpha, beta-ethylenically unsaturated monocarboxylic acid.

4. The method of claim 3 wherein said vinylidene monomer comprises a monomer selected from the group consisting of styrene, vinyl toluene, methyl methacrylate and acrylonitrile.

5. The method of claim 4, wherein from 10 to 100 parts of said dissolved copolymer is present per each 100 parts of vinylidene monomer.

6. The method of claim 5, wherein said dissolved copolymer contains from 8–20 mole percent of a monoalkyl ester of itaconic acid, from 5–60 mole percent of a hard alkyl ester of an alpha, beta-ethylenically unsaturated monocarboxylic acid and from 20–87 mole percent of a soft alkyl ester of an alpha, beta-ethylenically unsaturated monocarboxylic acid, the total being 100 mole percent.

7. The method of claim 6 wherein said monoalkyl ester of itaconic acid comprises a monoalkyl ester of itaconic acid containing from 4 to 8 carbon atoms in the alkyl group.

8. The method of claim 6 wherein said dissolved copolymer comprises methyl methacrylate and ethyl acrylate.

9. The method of providing light-colored, small particle size, freeze-thaw stable emulsion polymers, which comprises polymerizing styrene under alkaline free radical polymerization conditions in the presence of from about 10 to 100 parts of a dissolved emulsion copolymer comprising as its three essential monomers from 8 to 20 mole perecnt of a monoalkyl ester of itaconic acid, from 5 to 60 mole percent methyl methacrylate and from 20 to 87 mole percent ethyl acrylate wherein said three essential monomers comprise at least 60 mole percent of said copolymer per 100 parts of styrene.

References Cited by the Examiner
UNITED STATES PATENTS

| | | | |
|---|---|---|---|
| 2,795,664 | 6/1957 | Conn et al. | 260—29.6 |
| 2,862,906 | 12/1958 | Stein et al. | 260—29.6 |
| 3,037,881 | 6/1962 | McDowell | 260—29.6 |
| 3,037,952 | 6/1962 | Jordan et al. | 260—29.6 |

OTHER REFERENCES

Moilliet et al.: Surface Activity, Van Nostrand Co., New York, 1961.

MURRAY TILLMAN, *Primary Examiner.*

N. F. OBLON, *Assistant Examiner.*